(12) United States Patent  (10) Patent No.: US 8,121,739 B2
Haj-Maharsi et al.  (45) Date of Patent: Feb. 21, 2012

(54) REACTIVE POWER MANAGEMENT FOR WIND POWER PLANT INTERNAL GRID

(75) Inventors: Mohamed Haj-Maharsi, Houston, TX (US); Sunita Singh, Houston, TX (US); Kent Hans Søbrink, Middelfart (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/980,700

(22) Filed: Dec. 29, 2010

(65) Prior Publication Data

US 2011/0178646 A1 Jul. 21, 2011

(51) Int. Cl.
G06F 1/30 (2006.01)

(52) U.S. Cl. ............... 700/287; 290/44; 290/55
(58) Field of Classification Search ........ 700/287, 700/297, 298; 290/44, 55
See application file for complete search history.

(56) References Cited

U.S. PATENT DOCUMENTS

| 7,071,579 B2* | 7/2006 | Erdman et al. ............ 290/55 |
| 7,397,143 B2* | 7/2008 | Walling ............... 290/44 |
| 8,018,083 B2* | 9/2011 | Larsen et al. ............ 290/44 |
| 2010/0148508 A1 | 6/2010 | Garcia |
| 2010/0256829 A1* | 10/2010 | Sadaba et al. ............ 700/287 |
| 2010/0308585 A1 | 12/2010 | Jorgensen et al. |
| 2010/0320762 A1* | 12/2010 | Letas et al. ............ 290/44 |
| 2011/0095532 A1* | 4/2011 | Schubert et al. ............ 290/44 |
| 2011/0140511 A1* | 6/2011 | Larsen ............ 307/2 |
| 2011/0198847 A1* | 8/2011 | Hopewell ............ 290/44 |
| 2011/0295437 A1* | 12/2011 | Lu et al. ............ 700/287 |
| 2011/0304141 A1* | 12/2011 | Van Dyck et al. ............ 290/44 |

FOREIGN PATENT DOCUMENTS

| EP | 2299568 | 3/2011 |
| WO | 2009083446 | 7/2009 |
| WO | 2010018424 | 2/2010 |
| WO | 2011000825 | 1/2011 |

OTHER PUBLICATIONS

Bozhko et al. "Control of Offshore DFIG-Based Wind Farm Grid With Line-Commutated HVDC Connection". IEEE Transactions on Energy Conversion (Mar. 2007) 22.1: 71-78.*

* cited by examiner

*Primary Examiner* — Ryan Jarrett
(74) *Attorney, Agent, or Firm* — Wood, Herron & Evans, LLP (57) ABSTRACT

A wind power plant comprising a plurality of wind turbine converters coupled to a High Voltage Direct Current (HVDC) converter via an internal grid and a power plant controller. The power plant controller is configured to monitor a voltage of the internal grid, and allocate responsibility for generating reactive power to the HVDC converter and the wind turbine converters to maintain the voltage of the internal grid at a desired voltage.

20 Claims, 5 Drawing Sheets

REACTIVE POWER MANAGEMENT FOR WIND POWER PLANT INTERNAL GRID

FIELD OF THE INVENTION

Embodiments of the invention are generally related to wind turbines, and more specifically to management of reactive power in an internal grid of a wind power plant.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines generators may be arranged together in a wind park or wind power plant to generate sufficient energy to support a grid.

In addition to generating active power, the wind turbines may also be configured to generate and consume reactive power. Reactive power production and consumption may be necessary to maintain voltages at different points of interest in the wind power plant. Maintenance of voltages at these points of interest may be necessary to comply with grid requirements, prevent damage to wind turbine or wind plant components, and the like.

SUMMARY OF THE INVENTION

Embodiments of the invention are generally related to wind turbines, and more specifically to avoiding damage to the wind turbine caused due to instability.

One embodiment of the invention provides a method for maintaining a voltage in an internal grid of a wind power plant at a desired voltage. The method generally comprises detecting a change in the voltage in the internal grid, and in response to detecting the change in the voltage, calculating an amount of reactive power that should be generated to maintain the voltage of the internal grid at the desired voltage. The method further comprises determining a capability of a High Voltage Direct Current (HVDC) converter and one or more wind turbine converters to generate reactive power, and allocating the generation of reactive power to maintain the voltage of the internal grid at the desired voltage to at least one or more of the HVDC converter and the one or more wind turbine converters based on the determined capability.

Another embodiment of the invention provides a computer readable storage medium comprising a program product which, when executed by a processor is configured to perform an operation for maintaining a voltage in an internal grid of a wind power plant at a desired voltage. The operation generally comprises detecting a change in the voltage in the internal grid, and in response to detecting the change in the voltage, calculating an amount of reactive power that should be generated to maintain the voltage of the internal grid at the desired voltage. The operation further comprises determining a capability of a High Voltage Direct Current (HVDC) converter and one or more wind turbine converters to generate reactive power, and allocating the generation of reactive power to maintain the voltage of the internal grid at the desired voltage to at least one or more of the HVDC converter and the one or more wind turbine converters based on the determined capability.

Yet another embodiment of the invention provides a wind power plant, comprising a plurality of wind turbines, each wind turbine comprising at least one wind turbine converter device, a High Voltage Direct Current (HVDC) converter coupled to the wind turbine converter devices of the plurality of wind turbines via an internal grid, and a power plant controller. The power plant controller is generally configured to detect a change in a voltage in the internal grid, and in response to detecting the change in the voltage, calculate an amount of reactive power that should be generated to maintain the voltage of the internal grid at a desired voltage. The power plant controller is further configured to determine a capability of the HVDC converter and the wind turbine converter devices to generate reactive power, and allocate the generation of reactive power to maintain the voltage of the internal grid at the desired voltage to at least one or more of the HVDC converter and the wind turbine converter devices based on the determined capability.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide a wind power plant comprising a plurality of wind turbine converters coupled to a High Voltage Direct Current (HVDC) converter via an internal grid and a power plant controller. The power plant controller is configured to monitor a voltage level of the internal grid, and allocate responsibility for generating reactive power to the HVDC converter and the wind turbine converters to maintain the voltage level of the internal grid at a desired level.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
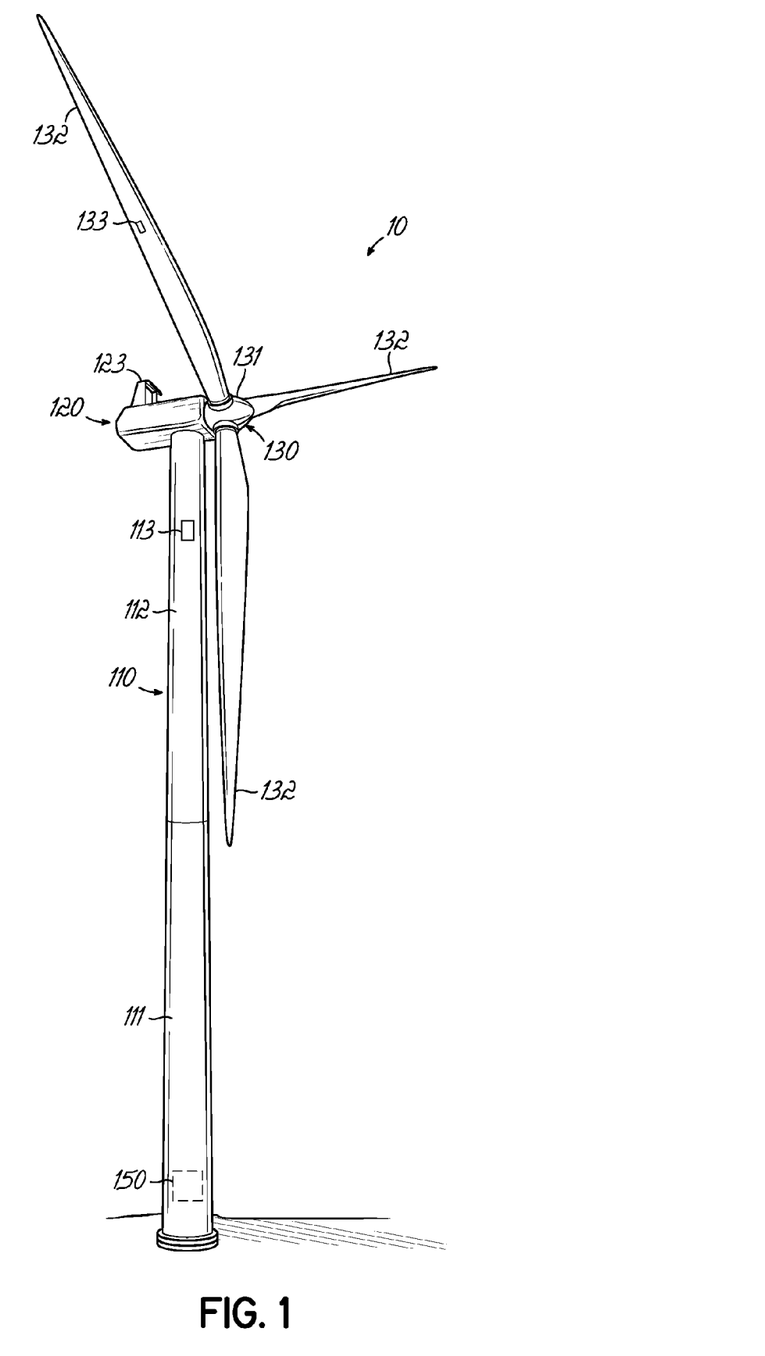
FIG. 1 illustrates an exemplary wind turbine according to an embodiment of the invention.

FIG. 1 illustrates an exemplary wind turbine 100 according to an embodiment of the invention. As illustrated in FIG. 1, the wind turbine 100 may include a tower 110, a nacelle 120, and a rotor 130. In one embodiment of the invention the wind turbine 100 may be an onshore wind turbine. However, embodiments of the invention are not limited only to onshore wind turbines. In alternative embodiments, the wind turbine 100 may be an off shore wind turbine located over a water body such as, for example, a lake, an ocean, or the like.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height. The tower 110 may be made from any reasonable material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 1). The rotor hub 131 may be configured to couple the at least one blade 132 to a shaft (not shown). In one embodiment, the blades 132 may have an aerodynamic profile such that, at predefined wind speeds, the blades 132 experience lift, thereby causing the blades to radially rotate around the hub. The movement of the blades may also cause the shaft of the wind turbine 100 to rotate. The nacelle 120 may include one or more components configured to convert aero-mechanical energy of the blades to rotational energy of the shaft, and the rotational energy of the shaft into electrical energy.

The wind turbine 100 may include a plurality of sensors for monitoring a plurality of parameters associated with, for example, environmental conditions, wind turbine loads, performance metrics, and the like. For example, a strain gauge 133 is shown on the blade 132. In one embodiment, the strain gauge 133 may be configured to detect bending and or twisting of the blades 132. The information regarding bending and twisting of the blades may be necessary to perform one or more operations that reduce the loads on the blades 132 that may occur, for example, during high wind gusts. In such situations, the blades may be pitched to reduce the loads, thereby preventing damage to the blades.

FIG. 1 also illustrates an accelerometer 113 that may be placed on the tower 110. The accelerometer 113 may be configured to detect horizontal movements and bending of the tower 110 that may be caused due to the loads on the wind turbine 100. The data captured by the accelerometer 113 may be used to perform one or more operations for reducing loads on the wind turbine 100. In some embodiments of the invention, the accelerometer 113 may be placed on the nacelle 120.

FIG. 1 also depicts a wind sensor 123. Wind sensor 123 may be configured to detect a direction of the wind at or near the wind turbine 100. By detecting the direction of the wind, the wind sensor 123 may provide useful data that may determine operations to yaw the wind turbine 100 into the wind. The wind sensor 123 may also detect a speed of the wind. Wind speed data may be used to determine an appropriate pitch angle that allows the blades 132 to capture a desired amount of energy from the wind. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 100.

While a strain gauge 133, accelerometer 113, and wind sensor 123 are described herein, embodiments of the invention are not limited to the aforementioned types of sensors. In general, any type and number of sensors may be placed at various locations of the wind turbine 100 to facilitate capturing data regarding structural health, performance, damage prevention, acoustics, and the like. For example, a pitch angle sensor may be placed at or near a wind turbine blade to determine a current pitch angle of the blade.

Figure 2:
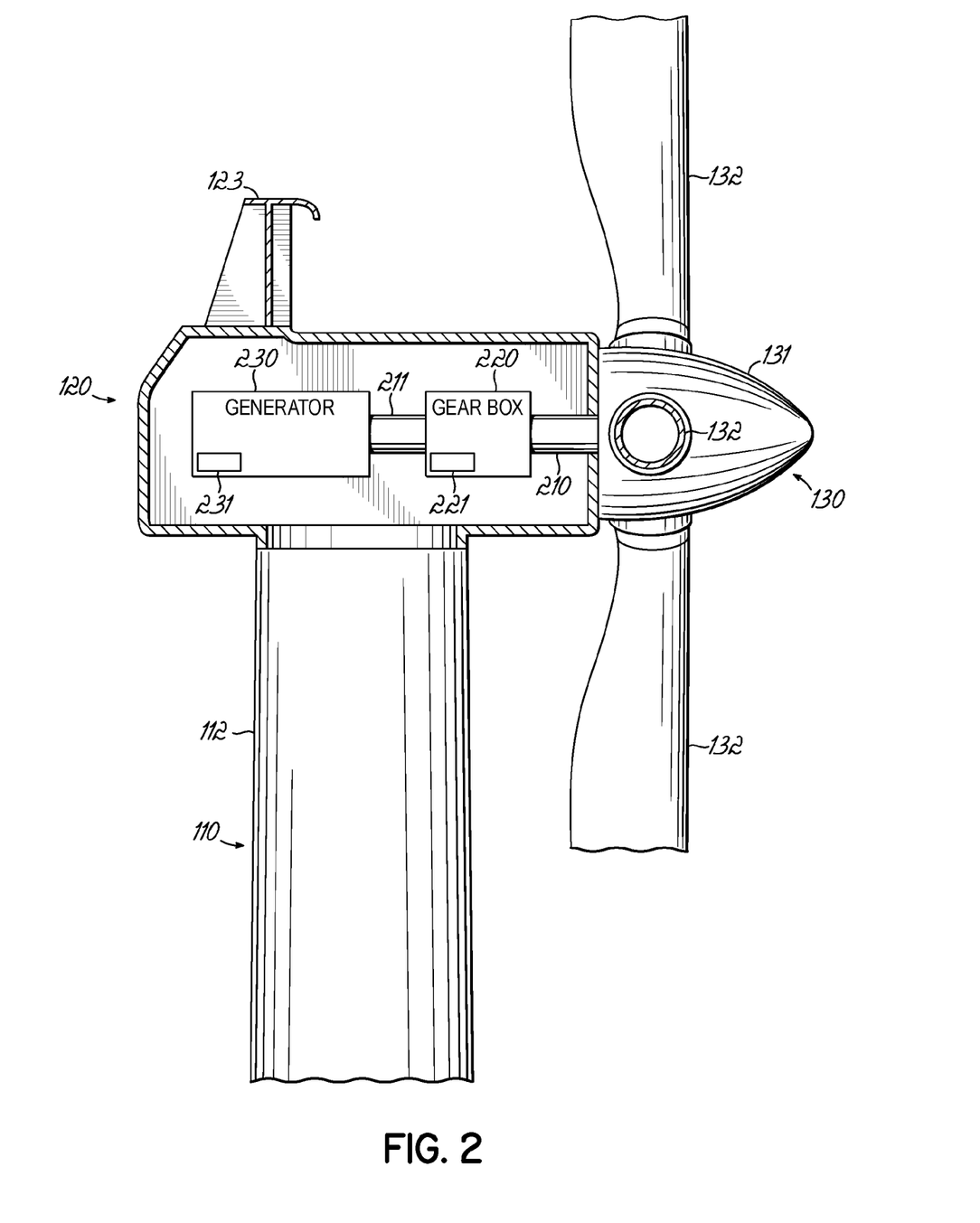
FIG. 2 illustrates an exemplary nacelle according to an embodiment of the invention

FIG. 2 illustrates a more detailed view of a nacelle 120 according to an embodiment of the invention. As illustrated in FIG. 2, the nacelle 120 may include at least a low speed shaft 210, a high speed shaft 211, a gearbox 220, and a generator 230. In one embodiment, the low speed shaft 210 may couple the gearbox 230 to the hub 130, as illustrated in FIG. 2. The gearbox 230 may rely on gear ratios in a drive train to provide speed and torque conversions from the rotation of the low speed shaft 210 to the rotor assembly of the generator 230 via the high speed shaft 211.

In an alternative embodiment, the low speed shaft 210 may directly connect the hub 130 with a rotor assembly of the generator 230 so that rotation of the hub 130 directly drives the rotor assembly to spin relative to a stator assembly of the generator 230. In embodiments where the low speed shaft 210 is directly coupled to the hub 130, the gear box 220 may not be included, thereby allowing the nacelle 120 to be smaller and/or lighter.

The generator 230 may be configured to generate a three phase alternating current based on one or more grid requirements. In one embodiment, the generator 230 may be a synchronous generator. Synchronous generators may be configured to operate at a constant speed, and may be directly connected to the grid. In some embodiments, the generator 230 may be a permanent magnet generator. In alternative embodiments, the generator 230 may be an asynchronous generator, also sometimes known as an induction generator. Induction generators may or may not be directly connected to the grid. For example, in some embodiments, the generator 230 may be coupled to the grid via one or more electrical devices configured to, for example, adjust current, voltage, and other electrical parameters to conform with one or more grid requirements. Exemplary electrical devices include, for example, inverters, converters, resistors, switches, and the like.

Embodiments of the invention are not limited to any particular type of generator or arrangement of the generator and one or more electrical devices associated with the generator in relation to the electrical grid. Any suitable type of generator including (but not limited to) induction generators, permanent magnet generators, synchronous generators, or the like, configured to generate electricity according to grid requirements falls within the purview of the invention.

In some embodiments, a plurality of sensors may be included in the nacelle 120 to monitor the structural health and performance of the components therein, the quality of the power generated, and the like. For example, a sensor 221 may be placed in the gear box 220 to detect mechanical strain and wear/tear of the gear box 220. A sensor 231 may be placed in the generator 230 to detect generator speed, power generation, or the like.

Figure 3:
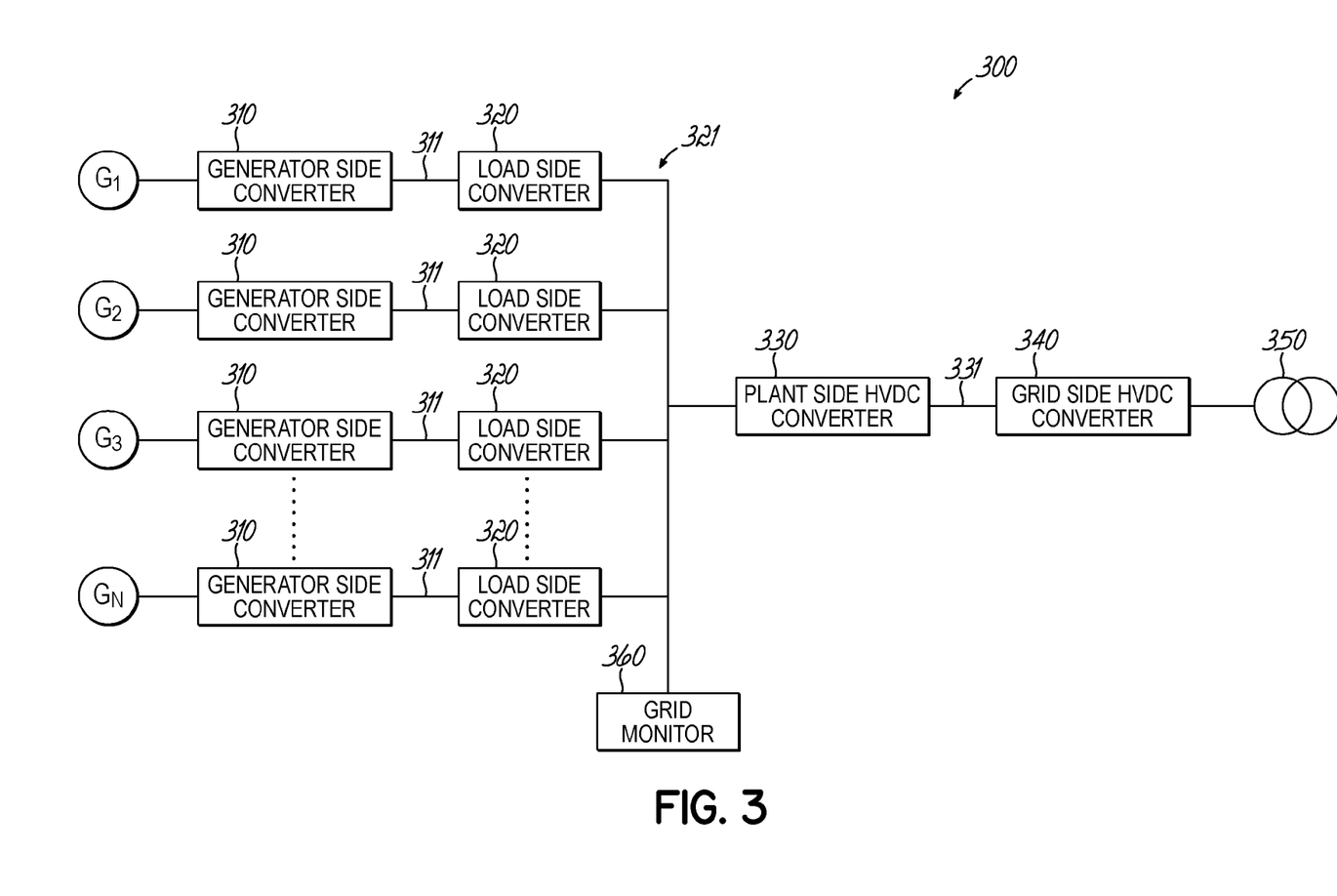
FIG. 3 illustrates an exemplary wind power plant according to an embodiment of the invention.

A plurality of wind turbines may be arranged together in a wind power plant. FIG. 3 illustrates a wind power plant 300, according to an embodiment of the invention. As illustrated in FIG. 3, the wind power plant 300 may include a plurality of generators G1-GN. Each of the generators G1-GN may correspond to a single wind turbine in the wind park, for example, the generator 230 illustrated in FIG. 2.

As further illustrated in FIG. 3, each of the generators G1-GN may be coupled with a respective generator side converter 310. The generator side converter 310 may be an AC-to-DC converter configured to convert the three phase alternating current (AC) power produced by a respective generator to direct current (DC) power. The DC power generated by the generator side converters 310 may be transferred to respective load side converters 320 via a DC link 311. The load side converters 320 may convert the DC power received from the generator side converters 310 back into a three phase AC power.

The function of the generator side converters 310 and the load side converters 320 may be to convert the variable power generated by the generators G1-GN into a more stable and well defined three phase AC power according to grid requirements. In other words, the power generated by the generators G1-GN may depend on wind speeds. Because wind speeds may constantly change, the power generated by the generators G1-GN may have varying phase. The generator side converters 310 and load side converters 320 may convert the variable power generated by the generators G1-GN into three phase AC power having a constant phase.

In one embodiment of the invention, the generator side converters 310 and the load side converters 320 may be included in the nacelles of respective turbines. Alternatively, the generator side converters 310 and the load side converters 320 may be located outside the nacelles.

In one embodiment, the power transferred through the load side converters 320 may be provided to a collection grid 321, as illustrated in FIG. 3. The collection grid 321 may couple wind turbines in the wind power plant to a plant side High Voltage Direct Current (HVDC) converter 330. The collection grid 321 is also referred to herein as an internal grid. In general, the internal grid may be any grid coupling a plurality of wind turbine converters (e.g., the converters 320) to an HVDC converter.

The plant side HVDC converter 330 may convert the three phase AC power received from the collection grid 321 to DC power for transmission over an HVDC link 331 to a grid side HVDC converter 340. The grid side HVDC converter 340 may convert the DC power received via the HVDC link 331 to three phase AC power having a constant phase. As illustrated in FIG. 3, the AC power may be transferred from the grid side HVDC converter 340 to a grid 350.

In one embodiment of the invention, the HVDC link 331 may be a long distance link coupling the plant side HVDC converter 330 to a grid side HVDC converter 340. For example, in a particular embodiment, the HVDC link may be greater than 80 kilometers long. The plant side HVDC converter 330, HVDC link 331, and the grid side HVDC converter 340 (referred to collectively as HVDC set up) may be particularly advantageous to connect remote wind power plants to a grid. For example, the HVDC set up may be used to connect an offshore wind power plant to an onshore grid. The HVDC set up may also be used to connect, for example, a wind power plant located at a location with favorable wind conditions to a distant location with high power demand. The transmission of power via the HVDC set up over long distances may be advantageous over AC transmission due to the relatively low transmission losses.

In addition to generating active power, the wind power plant 300 may also be configured to generate and consume reactive power. In general, active power, or real power, refers to the power that is transferred from the wind turbine generators to the grid 350. Reactive power refers to the power that cycles back and forth between the wind turbine generators and the grid. Maintaining control over reactive power in the system may be necessary for several reasons. For example, reactive power control may be necessary for controlling the voltage at predefined locations. Reactive power control may also be necessary for maintaining proper magnetization of components within the wind turbine generators, prevent damage to wind turbine or wind plant components, and the like.

In one embodiment of the invention, it may be necessary to maintain a constant voltage in an internal grid, e.g., the collector grid 321, of the wind plant 300. Maintaining a constant voltage may be necessary to comply with various grid codes, and deal with contingencies such as Low Voltage Ride Through (LVRT). In one embodiment, the voltage at the collector grid 321 may be a function of both, the active power generated by the turbine as well as the reactive power generated by the turbine. As discussed earlier, the active power generated by the generators G1-GN may directly depend on the wind speed. Accordingly, the reactive power generation may have to be controlled to maintain a constant voltage at the collector grid 321.

In one embodiment of the invention, a grid monitor 360 may be provided to monitor a voltage at the collector grid 321. The grid monitor may provide the measured voltage at the collector grid to one or more control devices configured to manage the generation of reactive power in the wind power plant, as will be discussed in greater detail below.

Figure 4:
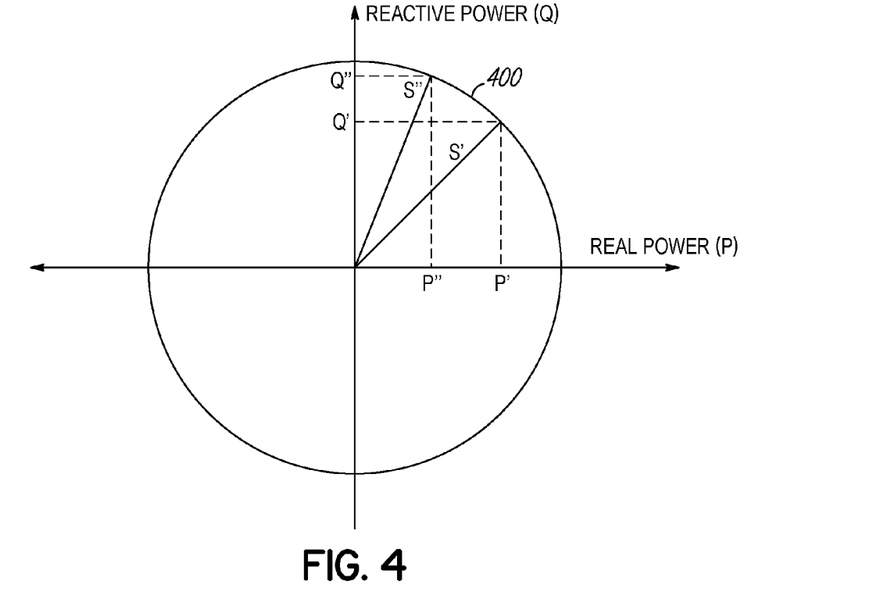
FIG. 4 illustrates an exemplary capability curve of a converter device according to an embodiment of the invention.

In one embodiment, the load side converters 320 and the plant side HVDC converter 330 may be configured to generate reactive power to manage a voltage at the collector grid 321. Each of the load side converters 320 and the plant side HVDC converter 330 may be configured to generate reactive power based on a capability curve for the respective converter. FIG. 4 illustrates an exemplary capability curve for an exemplary converter, according to an embodiment of the invention. Specifically, the circle 400 shown in FIG. 4 illustrates the complex power (S) rating for the exemplary converter. In other words, circle 400 represents the maximum (or rated) power (S) that may be transferred by the exemplary converter.

As illustrated in FIG. 4, the complex power (S) may be a function of the real or actual power (P) and the reactive power (Q). Accordingly, in one embodiment, if the actual power generated by a wind turbine or turbines is P', then the converter may have the capability of generating reactive power up to the value Q', as illustrated in FIG. 4. On the other hand, if the actual power generated by a wind turbine or turbines is P'', then the converter may have the capability of generating reactive power up to the value Q'', as illustrated in FIG. 4.

Therefore, for a given amount of actual power that is generated by the generators G1-GN, which may be based on wind speeds, the load side converters 320 and the plant side HVDC converter 330 may be capable of generating a predefined amount of reactive power to support the collector grid 321. Embodiments of the invention provide a control system for managing the reactive power generated by the wind power plant components.

Figure 5:
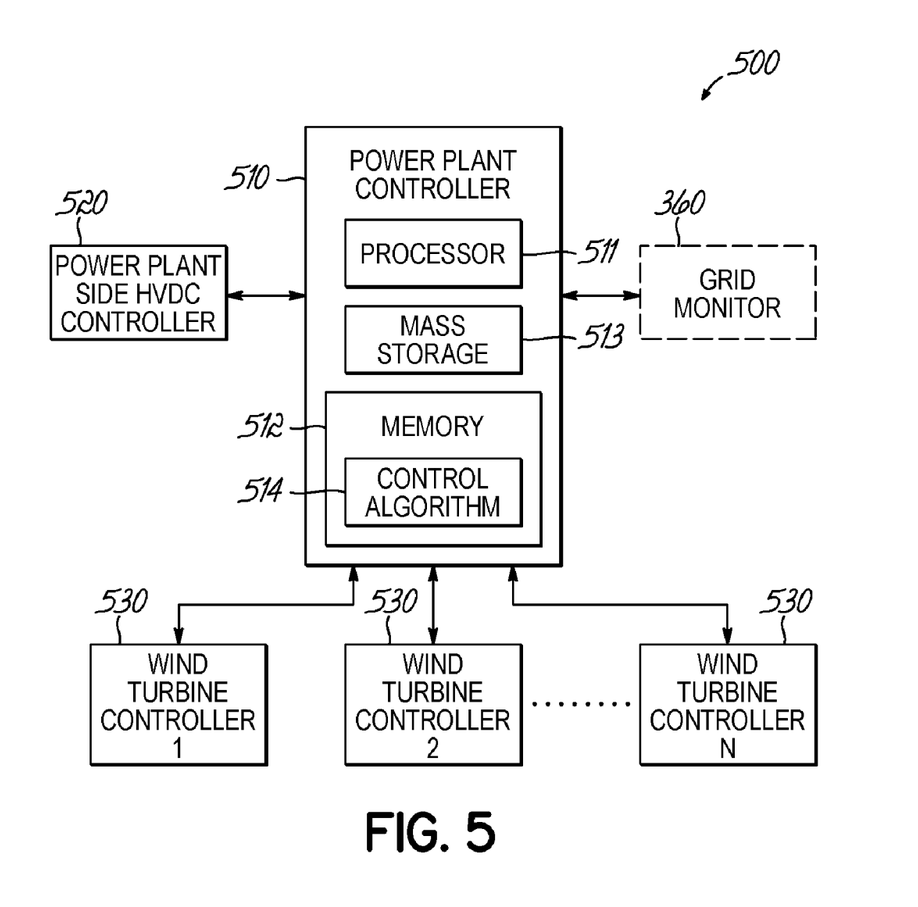
FIG. 5 illustrates an exemplary control network for a wind power plant according to an embodiment of the invention.

FIG. 5 illustrates an exemplary control system 500 for operating a wind power plant, e.g., the wind power plant 300 of FIG. 3. As illustrated in FIG. 5, the control system 500 may include a Power Plant Controller (PPC) 510 coupled with a power plant side HVDC controller 520 and a plurality (N) of wind turbine controllers 530. The power plant controller 510 is a supervisory control system for the wind power plant that can be implemented using at least one processor 511 selected from microprocessors, micro-controllers, microcomputers, digital signal processors, central processing units, field programmable gate arrays, programmable logic devices, state machines, logic circuits, analog circuits, digital circuits, and/ or any other devices that manipulate signals (analog and/or digital) based on operational instructions that are stored in a memory 512.

The memory 512 may be a single memory device or a plurality of memory devices including but not limited to random access memory (RAM), volatile memory, non-volatile memory, static random access memory (SRAM), dynamic random access memory (DRAM), flash memory, cache memory, and/or any other device capable of storing digital information. The power plant controller may 510 include a mass storage device 513 may include one or more hard disk drives, floppy or other removable disk drives, direct access storage devices (DASD), optical drives (e.g., a CD drive, a DVD drive, etc.), and/or tape drives, among others.

The processor 511 of the power plant controller 510 may operate under the control of an operating system, and executes or otherwise relies upon computer program code embodied in various computer software applications, components, programs, objects, modules, data structures, etc. The computer program code residing in memory 512 and stored in the mass storage device 513 also includes a control algorithm 514 that, when executing on the processor 511, controls and manages the reactive power at an internal grid of the wind power plant (e.g., the collector grid 321 of FIG. 3) by using numerical calculations and operational logic to control the output from components of the wind power plant. The computer program code typically comprises one or more instructions that are resident at various times in memory 512, and that, when read and executed by the processor 511, causes the power plant controller 510 to perform the steps necessary to execute steps or elements embodying the various embodiments and aspects of the invention.

Various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

As illustrated in FIG. 5, the power plant controller 510 is connected in communication with the wind turbine controllers 530. Wind interacts with the wind turbines, as explained above, to generate electrical power from the torque supplied from the rotor to the generator. Control signals from the power plant controller 510 may be used by each of the wind turbine controllers 530 to dynamically vary the output of the respective wind turbines in the wind farm to meet certain output requirements on the generated electrical power. For example, in response to a control signal received from the power plant controller 510, each of the wind turbine controllers 530, for example, may control the yawing of the nacelle, pitching of one or more blades of the wind turbine, and the like.

Each of the wind turbine controllers may be associated with a respective wind turbine in a wind park. In one embodiment, the wind turbine controllers 530 may be configured to control the operation of the respective turbine power converters (e.g., the load side converters 320 of FIG. 3). For example, in one embodiment, the wind turbine controllers 530 may be configured to exchange control signals and data with the power plant controller 510. For example, the wind turbine controllers 530 may be configured to transfer device data regarding the turbine power converters to the power plant controller 510. In a particular embodiment, the wind turbine controllers 530 may transfer data defining a capability curve of the power converter to the power plant controller 510.

The power plant side HVDC controller 520 may be configured to control the operation of an HVDC converter, e.g. the plant side HVDC converter 330 of FIG. 3. In one embodiment of the invention, the power plant side HVDC controller 520 may be configured to exchange control signals and data with the power plant controller 510. For example, the power plant side HVDC controller 520 may be configured to transfer device data regarding the HVDC power converters to the power plant controller 510. In a particular embodiment, the power plant side HVDC controller 520 may transfer data defining a capability curve of the HVDC converter to the power plant controller 510.

In one embodiment of the invention, the power plant controller 510 may be configured to receive an input from the grid monitor 360, as illustrated in FIG. 5. In one embodiment, the input from the grid monitor 360 may indicate a real time voltage level in an internal grid such as the collector grid 321 of a wind park. As described earlier, it may be desirable to maintain a constant voltage level in the internal grid. However, fluctuations in the internal grid voltage may occur due to faults, variations in the actual power generated from the generators of the wind turbines, and the like.

In one embodiment of the invention, the power plant controller 310 may be configured to compute an amount of reactive power that should be produced to maintain the voltage levels in internal grid when a fault or other voltage changing event occurs. For example, when a grid fault causes the voltage level to drop, the reactive power generation may have to be increased for fast voltage recovery.

Upon calculating the amount of total reactive power that needs to be produced, the power plant controller 310 may allocate the task of reactive power generation to one or more converters of the wind park. For example, the power controller 310 may cause the plant side HVDC controller 330 and one or more load side converter 320 to generate the required reactive power. Specifically, the power plant controller 310 may signal the power plant side HVDC controller 520 and one or more wind turbine controllers 530, wherein the signal may indicate an amount of reactive power that must be generated by a respective converter. Upon controllers 520 and 530 may then cause respective converters to generate the indicated power.

During allocation of reactive power to be generated by each converter in the wind park, the power plant controller 510 may consider the capability of each converter. In other words, the power plant controller 510 may determine, based on the converter data, a maximum amount of reactive power that may be generated by each converter prior to determining the allocation responsibility for generating reactive power. The maximum amount of reactive power capability may depend on, for example, the amount of active power being generated and the capability curve of the converter.

In one embodiment of the invention, the power plant controller 510 may utilize a priority scheme for allocating responsibility for reactive power generation to the converters. For example, in a particular embodiment, the main responsibility for generating required reactive power may lay primarily with the plant side HVDC converter. Wind turbine converters may be engaged to produce reactive power only when the plant side HVDC converter is not capable of generating all the required reactive power. The priority scheme hereinabove is provided only as an example. In alternative embodiments, any reasonable priority scheme may be implemented.

Figure 6:
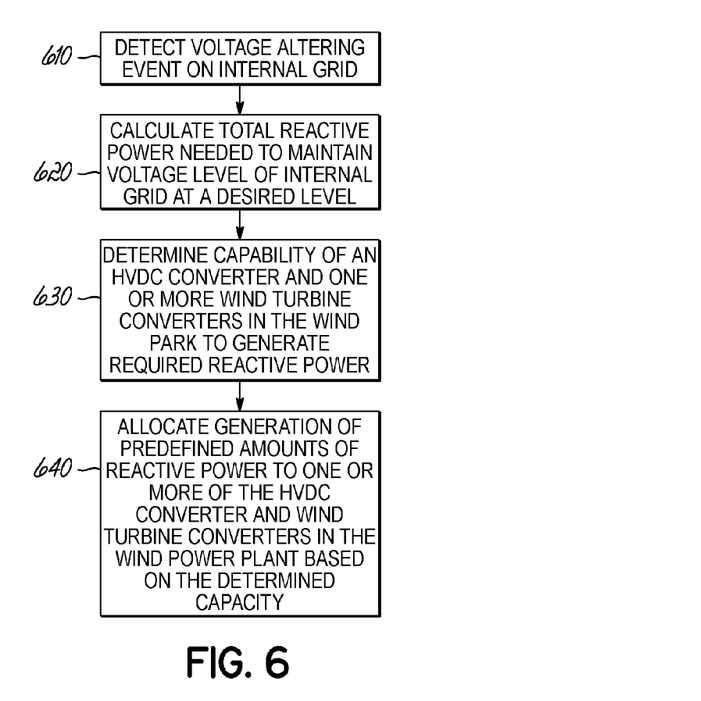
FIG. 6 is a flow diagram of exemplary operations performed by a power plant controller according to an embodiment of the invention.

FIG. 6 is a flow diagram of exemplary operations performed by a power plant controller, according to an embodiment of the invention. The operations may begin in step 610 by detecting a voltage altering event on an internal grid of a wind power plant. The voltage altering event may occur, for example, due to a fault in one or more turbines, a short circuit in the internal grid, fluctuations in generated actual power, and the like. The detection of the voltage altering event may be facilitated by a grid monitor, as described above.

In step 620, the power plant controller may calculate a total amount of reactive power that must be generated to maintain a desired voltage level of the internal grid and one or more converters. In step 630, the power plant controller may determine the capability of one or more converters in the wind park to generate the required reactive power. In step 640, the power plant controller may allocate generation of predefined amounts of reactive power to each of one or more converters in the wind power plant based on their respective capability.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method for maintaining a voltage in an internal grid of a wind power plant at a desired voltage, comprising:
   detecting a change in the voltage in the internal grid;
   in response to detecting the change in the voltage, calculating an amount of reactive power that should be generated to maintain the voltage of the internal grid at a desired voltage;
   determining a capability of a High Voltage Direct Current (HVDC) converter and one or more wind turbine converters to generate reactive power; and
   allocating the generation of reactive power to maintain the voltage of the internal grid at the desired voltage to at least one or more of the HVDC converter and the one or more wind turbine converters based on the determined capability.

2. The method of claim 1, wherein detecting the change in the voltage in the internal grid comprises receiving a signal from a grid monitor configured to monitor the voltage of the internal grid.

3. The method of claim 1, wherein determining the capability of the HVDC converter and the one or more wind turbine converters to generate reactive power comprises:
   retrieving converter data from a controller associated with each of the HVDC converter and the one or more wind turbine converters.

4. The method of claim 1, wherein the allocation of generation of reactive power to one or more of the HVDC converter and the one or more wind turbine converters is based on a priority scheme.

5. The method of claim 4, wherein the HVDC converter is allocated the prime responsibility for generating the reactive power to maintain the voltage of the internal grid at the desired voltage.

6. The method of claim 1, wherein the internal grid couples the one or more wind turbine converters to the HVDC converter.

7. A non-transitory computer readable storage medium storing a program product which, when executed by a processor is configured to perform an operation for maintaining a voltage in an internal grid of a wind power plant at a desired voltage, the operation comprising:
   detecting a change in the voltage in the internal grid;
   in response to detecting the change in the voltage, calculating an amount of reactive power that should be generated to maintain the voltage of the internal grid at the desired voltage;
   determining a capability of a High Voltage Direct Current (HVDC) converter and one or more wind turbine converters to generate reactive power; and
   allocating the generation of reactive power to maintain the voltage of the internal grid at the desired voltage to at least one or more of the HVDC converter and the one or more wind turbine converters based on the determined capability.

8. The non-transitory computer readable storage medium of claim 7, wherein detecting the change in the voltage in the internal grid comprises receiving a signal from a grid monitor configured to monitor the voltage of the internal grid.

9. The non-transitory computer readable storage medium of claim 7, wherein determining the capability of the HVDC converter and the one or more wind turbine converters to generate reactive power comprises retrieving converter data from a controller associated with each of the HVDC converter and the one or more wind turbine converters.

10. The non-transitory computer readable storage medium of claim 7, wherein the allocation of generation of reactive power to one or more of the HVDC converter and the one or more wind turbine converters is based on a priority scheme.

11. The non-transitory computer readable storage medium of claim 10, wherein the HVDC converter is allocated the prime responsibility for generating the reactive power to maintain the voltage of the internal grid at the desired voltage.

12. The non-transitory computer readable storage medium of claim 7, wherein the internal grid couples the one or more wind turbine converters to the HVDC converter.

13. A wind power plant, comprising:
- a plurality of wind turbines, each wind turbine comprising at least one wind turbine converter device;
- a High Voltage Direct Current (HVDC) converter coupled to the wind turbine converter devices of the plurality of wind turbines via an internal grid; and
- a power plant controller configured to:
  - detect a change in a voltage in the internal grid;
  - in response to detecting the change in the voltage, calculate an amount of reactive power that should be generated to maintain the voltage level of the internal grid at a desired voltage;
  - determine a capability of the HVDC converter and the wind turbine converter devices to generate reactive power; and
  - allocate the generation of reactive power to maintain the voltage of the internal grid at the desired voltage to at least one or more of the HVDC converter and the wind turbine converter devices based on the determined capability.

14. The wind power plant of claim 13, further comprising:
a grid monitor configured to provide the voltage of the internal grid in real time to the power plant controller.

15. The wind power plant of claim 13, wherein determining the capability of the HVDC converter and the wind turbine converter devices to generate reactive power comprises retrieving converter data from a controller associated with each of the HVDC converter and the wind turbine converter devices.

16. The wind power plant of claim 13, wherein the allocation of generation of reactive power to one or more of the HVDC converter and the wind turbine converter devices is based on a priority scheme.

17. The wind power plant of claim 16, wherein the HVDC converter is allocated the prime responsibility for generating the reactive power to maintain the voltage of the internal grid at the desired voltage.

18. The wind power plant of claim 13, wherein the HVDC converter is configured to convert Alternating Current (AC) power to Direct Current (DC) power.

19. The wind power plant of claim 13, wherein the wind turbine converter device is configured to convert DC power to AC power.

20. The wind power plant of claim 13, wherein the plurality of wind turbines are located offshore.

* * * * *